Patented Jan. 23, 1934

1,944,514

UNITED STATES PATENT OFFICE 1,944,514

ACYLATED CYCLOHEXYL-PHENYL-AMINES AND PROCESS OF PREPARING THEM

Georg Kalischer, Frankfort-on-the-Main, and Richard Fleischhauer, Frankfort - on - the-Main-Fechenheim, Germany, assignors to General Aniline Works, Inc., New York, N. Y., a corporation of Delaware No Drawing. Application December 5, 1929, Serial No. 411,977, and in Germany December 19, 1928

12 Claims. (Cl. 260—124)

The present invention relates to acylated cyclohexyl-phenyl-amines and a process of preparing them.

U. S. Pat. No. 1,836,295 describes a process of preparing condensation products which consists in causing cyclohexylamine or a substitution product thereof to react with a nitro derivative of the aromatic series containing a reactive halogen atom, whereby hydrogen halide is formed, and reducing, if desired, the N-cyclohexyl-nitroaryl-amino derivatives to the corresponding amino derivatives.

We have found an especially advantageous method of carrying out this reduction by first replacing in a N-cyclohexyl-nitroaryl-amine of the following general formula:

cyclohexyl—NH—aryl—NO₂ wherein aryl stands for an aryl radical the hydrogen atoms of which may be substituted or not and cyclohexyl stands for a cyclohexyl radical the hydrogen atoms of which may be unsubstituted or substituted, for instance, by a CH₃ group, the hydrogen atom of the NH-group by an acyl group by treating the said amine with an acylating agent. During the subsequent reduction of the NO₂-group to the NH₂-group which may be carried out both in an acid and in an alkaline medium the acyl group remains unaltered. By again splitting off the acyl group in the usual manner from the N-acyl-cyclohexyl- aminoaryl-amines thus obtained amino compounds are obtained which are identical with those described in the above mentioned U. S. patent.

The N-acyl-cyclohexyl-aminoaryl-amines thus obtained and the corresponding amino compounds containing no acyl group are throughout almost colorless, well crystallizing compounds which can be diazotized in the usual manner and may be used for the preparation of azo dyestuffs. As compared with the corresponding non-hydrogenated aromatic amino compounds they have the particular advantage of a great stability to oxidizing agents.

Consequently according to our present invention products are obtained which are characterized by the following general formula:

wherein aryl stands for an aryl radical the hydrogen atoms of which may be substituted or not, cyclohexyl stands for a cyclohexyl radical the hydrogen atoms of which may be unsubstituted or substituted, for instance, by a CH₃ group, X 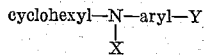 for an acyl group and Y for a NO₂- or a NH₂- group.

The following examples serve to illustrate our invention but they are not intended to limit it thereto; the parts being by weight:

(1) 22 parts of cyclohexyl-amino-4-nitrobenzene are heated with 11 parts of acetic anhydride until they are almost completely dissolved. The acetylation is completed on the water bath at about 80°–90° C. The 1-N-acetyl-cyclohexyl-amino-4-nitrobenzene, precipitated in the usual manner can be recrystallized from dilute alcohol, dilute acetic acid or ligroin and then forms colorless crystals of the melting point 114° C.

26.2 parts of the acetyl compound thus obtained are gradually introduced into a boiling mixture of 20 parts of iron turnings, about 100 parts of water and about 20 parts of acetic acid of 10 per cent strength. About 24 parts of alcohol are then preferably added thereto and the reduction is completed by boiling in a reflux apparatus. The reaction liquid is then rendered alkaline by adding sodium carbonate, filtered hot in order to remove the iron, and the residue is extracted with boiling alcohol. On cooling, the 1-N-acetyl-cyclohexylamino-4-aminobenzene precipitates from the filtrates in the form of colorless crystals of the melting point 143° C. When recrystallizing the product from dilute alcohol the melting point does not change. The compound thus obtained yields with sodium nitrite and hydrochloric acid an almost clear diazo solution, which is capable of coupling with the usual azo components.

The cyclohexylamino-4-nitrobenzene can be benzoylated in the same manner by heating it with benzoylchloride to 110° C. to 120° C. with addition of a minute quantity of concentrated sulfuric acid. When recrystallized from alcohol the N-benzoyl compound thus obtained melts at about 149° C. By reducing it, for instance, by means of iron and acetic acid in dilute alcohol the 1-N-benzoyl-cyclohexylamino-4-aminobenzene is obtained, which, when recrystallized from alcohol melts at about 185° C.

The N-2′.5′-dichloro-benzoyl-cyclohexylamino-4-nitrobenzene prepared in the same manner and melting when recrystallized from alcohol at about 206° C. yields on reduction, which preferably is conducted by means of iron and acetic acid in the presence of a suitable solvent, the 1-N-2′.5′-dichloro-benzoyl-cyclohexylamino-4-amino-benzene which in a pure state melts at 196° C.

The N-3′-nitrobenzoyl-cyclohexylamino-4-nitrobenzene prepared in the same manner melts in a pure state at about 147° C. and yields when reduced, the N-3'-aminobenzoyl-cyclohexylamino-4-aminobenzene of the melting point 180° C. On reduction the 1-N-acetyl-ortho- and para-methyl-cyclohexylamino-4-nitrobenzenes, of the melting point 112° C. and 135° C., respectively, prepared in the same manner are transformed into the corresponding amino compounds of the melting point 84° C. and 140° C., respectively.

(2) 32.2 parts of sodium 1-N-cyclohexylamino-4-nitrobenzen-2-sulfonate are treated with 40 parts of acetic anhydride with the addition of 0.1 part of concentrated sulfuric acid and after a short heating to about 90° C. the mass is poured on ice immediately after it has become almost colorless. On adding sodium chloride the 1-N-acetyl-cyclohexylamino-4-nitrobenzene-2-sulfonic acid can be almost completely precipitated. The crystals thus produced are filtered by suction and dried. The new compound forms a colorless powder which is readily soluble in water, acids and alkalies.

34.2 parts of 1-N-acetyl-cyclohexylamino-4-nitrobenzene-2-sulfonic acid are introduced into a boiling mixture of 30 parts of iron turnings, 100 parts of water and 5 parts of acetic acid of 10 per cent strength. The reaction first proceeds without external heating. Stirring is continued for some time at boiling temperature, the mass is rendered alkaline by the addition of sodium carbonate and the ferruginous mud is filtered by suction. The 1-N-acetyl-cyclohexylamino-4-aminobenzene-2-sulfonic acid can almost quantitatively be precipitated from the filtrate by the addition of a mineral acid. After filtration and drying it forms a white powder which is soluble in water and readily soluble in alkalies. The diazo solution obtained therefrom is almost colorless.

The 1-N-cyclohexylamino-2-nitrobenzene-4-sulfonic acid can be acetylated and reduced in the same manner. The 1-N-acetyl-cyclohexylamino-2-aminobenzene-4-sulfonic acid thus obtained yields a diazo compound which in contrast with the non-acetylated compound is capable of coupling with an azo component.

(3) A solution containing 36.4 parts of 1-N-acetyl-cyclohexylamino-4-nitrobenzene-2-sulfonic acid, 25 parts of ammonia of 20 per cent strength and 100 parts of water is introduced into a boiling mixture of 10 parts of zinc dust and 35 parts of ammonia of 20 per cent strength. The reaction sets in immediately and is completed by further adding a small quantity of zinc dust and heating for a short time. While still hot the reaction liquid is separated from the remaining zinc dust. From the filtrate which is feebly acidified with hydrochloric acid the 1-N-acetyl-cyclohexylamino-4-aminobenzene-2-sulfonic acid can be isolated. It is identical with the compound obtained according to Example 2.

(4) 23.2 parts of 1-N-acetyl-cyclohexylamino-4-aminobenzene (Example 1) are dissolved in about 100 parts of hydrochloric acid of 15 per cent strength, the solution is boiled for some time in a reflux apparatus, filtered and, after cooling, ammonia is added until there is an alkaline reaction. During this operation the 1-N-cyclohexylamino-4-aminobenzene separates in the form of reddish crystals.

In order to split off the acetyl group sulfuric acid or other saponifying agents may be used instead of the hydrochloric acid, with the same result.

We claim:

1. The process of preparing acylated cyclohexyl-phenyl-amines which consists in replacing in a N-cyclohexyl-nitroaryl-amine of the following general formula:

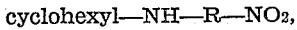

cyclohexyl—NH—R—NO₂, wherein R stands for a benzene radical, the hydrogen atoms of which may be substituted by the nitro- or sulfo-group and "cyclohexyl" stands for a cyclohexyl radical, the hydrogen atoms of which may be substituted by the methyl group, the hydrogen atom of the NH-group by an acyl group by treating the said compound with an acylating agent, and subsequently reducing the NO₂-group of the compound thus obtained to the NH₂-group.

2. The process of preparing acylated cyclohexyl-phenyl-amines which consists in replacing in a N-cyclohexyl-nitroaryl-amine of the following general formula:

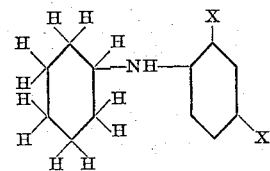

wherein one X stands for a NO₂-group, the other X for hydrogen, a nitro- or a sulfo-group, the hydrogen atom of the NH-group by an acyl group by treating the said compound with an acylating agent, and subsequently reducing the NO₂-group of the compound thus obtained to the NH₂-group.

3. The process of preparing acylated cyclohexyl-phenyl-amines which consists in replacing in a N-cyclohexyl-nitroaryl-amine of the following general formula:

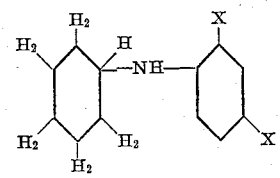

wherein one X stands for a NO₂-group and the other X for a sulfo group, the hydrogen atom of the NH-group by an acetyl group by treating the said compound with acetic anhydride and subsequently reducing the NO₂-group of the compound thus obtained to the NH₂-group.

4. The process of preparing acylated cyclohexyl-phenyl-amines which consists in replacing in a N-cyclohexyl-nitroaryl-amine of the following formula:

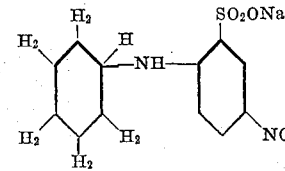

the hydrogen atom of the NH-group by an acetyl group by treating the said compound with acetic anhydride in the presence of a minute quantity of concentrated sulfuric acid, while shortly heating the reaction mass to about 90° C., and subsequently reducing the NO₂-group of the compound thus obtained to the NH₂-group.

5. As new products, the compounds of the following general formula:

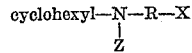

cyclohexyl—N—R—X
         |
         Z wherein R stands for a benzene radical, the hydrogen atoms of which may be substituted by the nitro- or sulfo-group, "cyclohexyl" stands for a cyclohexyl radical, the hydrogen atoms of which may be substituted by the methyl group, Z for an acyl group and X for a NO₂- or NH₂-group.

6. As new products the compounds of the following general formula:

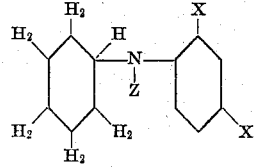

wherein Z stands for an acyl group, one X for a NO₂- or NH₂-group, the other X for hydrogen, a nitro-, amino- or sulfo group.

7. As new products the compounds of the following general formula:

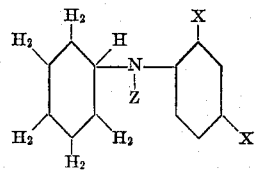

wherein Z stands for an acetyl group, one X for a NO₂- or NH₂-group and the other X for hydrogen or a sulfo group.

8. As new products the compounds of the following general formula:

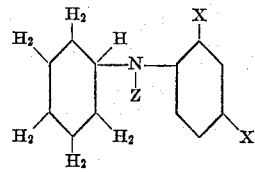

wherein Z stands for an acetyl group, one X for a NH₂-group and the other X for hydrogen or a sulfo group, the said products being colorless, well crystallizing compounds which can be diazotized in the usual manner and may be used for the preparation of azo dyestuffs.

9. As new products the compounds of the following formula:

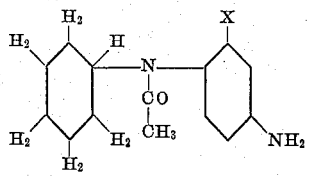

wherein X stands for hydrogen or a sulfo group the said products being white powders which can be diazotized.

10. As a new product the compound of the following formula:

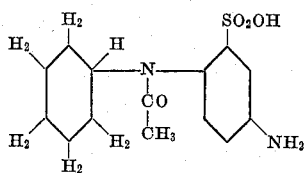

said product being a white powder which is soluble in water, readily soluble in alkalies and which can be diazotized.

11. As a new product, the compound of the following formula:

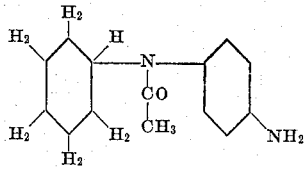

said product being a colorless crystallized compound which melts at 143° C.

12. As a new product, the compound of the following formula:

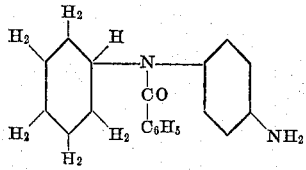

said product being a colorless crystallized compound which melts at about 185° C.

GEORG KALISCHER.
RICHARD FLEISCHHAUER.